(12) United States Patent
Albahri (10) Patent No.: US 11,076,247 B2
(45) Date of Patent: Jul. 27, 2021

(54) ACOUSTIC RECEIVER WITH B-STAGE SEAL AND METHOD OF MAKING SAME

(71) Applicant: Knowles Electronics, LLC, Itasca, IL (US)

(72) Inventor: Shehab Albahri, Hanover Park, IL (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 16/729,663

(22) Filed: Dec. 30, 2019

(65) Prior Publication Data

US 2020/0213788 A1 Jul. 2, 2020

Related U.S. Application Data

(60) Provisional application No. 62/787,082, filed on Dec. 31, 2018.

(51) Int. Cl.
*H04R 1/02* (2006.01)
*H04R 25/00* (2006.01)
*B29C 35/08* (2006.01)
*B29K 101/10* (2006.01)

(52) U.S. Cl.
CPC ....... *H04R 25/658* (2013.01); *B29C 35/0805* (2013.01); *B29K 2101/10* (2013.01); *H04R 2225/77* (2013.01)

(58) Field of Classification Search
CPC .......................... H04R 25/658; B29C 35/0805
See application file for complete search history.

(56) References Cited

U.S. PATENT DOCUMENTS

| 3,935,398 A | 1/1976 | Carlson et al. |
| 5,690,093 A | 11/1997 | Schrank et al. |
| 6,757,403 B2 | 6/2004 | Urushibata et al. |

(Continued)

FOREIGN PATENT DOCUMENTS

| CN | 204350285 U | 5/2015 |
| CN | 205596313 U | 9/2016 |

(Continued)

OTHER PUBLICATIONS

European Patent Office; International Search Report and Written Opinion; International Application No. PCT/US2018/041921; dated Feb. 15, 2019.

(Continued)

*Primary Examiner* — Simon King
(74) *Attorney, Agent, or Firm* — Faegre Drinker Biddle & Reath LLP (57) ABSTRACT

An acoustic receiver employs one or more housing endplates recessed below an edge of a sidewall of the housing. In some implementations, a cured b-stage material is disposed in a recess along an interface between an endplate and a sidewall of the housing, wherein the cured b-stage material acoustically seals at least a portion of the housing. In some implementations, both a top housing endplate and a bottom housing endplate are recessed and have cured b-stage material disposed in respective recesses along an interface between the endplates and housing sidewalls wherein the cured b-stage material acoustically seals a top and bottom portion of the housing.

21 Claims, 9 Drawing Sheets

(56) References Cited

U.S. PATENT DOCUMENTS

| | | | |
|---|---|---|---|
| 2006/0140436 A1 | 6/2006 | de Moel et al. | |
| 2006/0239488 A1 | 10/2006 | Geschiere et al. | |
| 2010/0054509 A1 | 3/2010 | Thompson | |
| 2012/0008814 A1* | 1/2012 | Alwicker | H04R 1/1058 381/380 |
| 2012/0286865 A1 | 11/2012 | Chandrasekaran | |
| 2013/0272564 A1 | 10/2013 | Milller | |
| 2014/0369548 A1 | 12/2014 | Manley et al. | |
| 2015/0036831 A1 | 2/2015 | Klippel | |
| 2015/0249889 A1 | 9/2015 | Iyer et al. | |
| 2016/0227328 A1 | 8/2016 | Van Halteren et al. | |
| 2019/0238994 A1 | 8/2019 | King et al. | |
| 2020/0154212 A1 | 5/2020 | Albahri et al. | |

FOREIGN PATENT DOCUMENTS

| | | |
|---|---|---|
| CN | 107135449 A | 9/2017 |
| CN | 107222818 A | 9/2017 |
| CN | 206775740 U | 12/2017 |
| CN | 206879090 U | 1/2018 |
| CN | 207354540 U | 5/2018 |
| GB | 859830 A | 1/1961 |
| WO | 2015/057519 A1 | 4/2015 |
| WO | 2016/058637 A1 | 4/2016 |
| WO | 2019/014510 A2 | 1/2019 |

OTHER PUBLICATIONS

European Patent Office; International Search Report and Written Opinion; International Application No. PCT/US2017/056873; dated Mar. 19, 2018.

\* cited by examiner

ACOUSTIC RECEIVER WITH B-STAGE SEAL AND METHOD OF MAKING SAME

RELATED APPLICATIONS

This application claims priority to U.S. Provisional Patent Application Ser. No. 62/787,082 filed on Dec. 31, 2018, entitled "Acoustic Receiver with B-Stage Steal and Method of Making Same," the entire contents of which is hereby incorporated by reference.

TECHNICAL FIELD

The disclosure relates to acoustic receivers such as, but not limited, to balanced armature receivers, and methods therefor.

BACKGROUND

Acoustic receivers are used in hearing instruments such as hearing aids, headphones, and earbuds among other devices. Acoustic receivers typically include a motor having a coil, a yoke that retains magnets, and a reed (or armature) having a portion that extends through the coil and between the magnets. An electrical signal applied to the coil creates a magnetic field within the motor causing the reed to move between the magnets. Movement of the reed in turn causes movement of a diaphragm within a receiver housing, from which sound is emitted from an acoustic port. However, manufacturing operations to assemble the receiver are slow and costly due to the laborious manual assembly of the various components. Operators typically have to spend a lot of time loading and unloading the acoustic receiver into different fixtures during the assembly process. Accordingly, a need exists for an improved acoustic receiver and manufacturing methods.

Those of ordinary skill in the art will appreciate that elements in the figures are illustrated for simplicity and clarity. It will be further appreciated that certain actions or steps may be described or depicted in a particular order of occurrence while those of ordinary skill in the art will understand that such specificity with respect to sequence is not actually required unless a particular order is specifically indicated. It will also be understood that the terms and expressions used herein have the ordinary meaning as is accorded to such terms and expressions with respect to their corresponding respective fields of inquiry and study except where specific meanings have otherwise been set forth herein.

DETAILED DESCRIPTION

The disclosure is drawn generally to acoustic receivers that employ one or more housing endplates recessed below an edge of a sidewall of the housing. In some implementations, a cured b-stage material is disposed in a recess along an interface between an endplate and a sidewall of the housing, wherein the cured b-stage material acoustically seals at least a portion of the housing. In some implementations, both a top housing endplate and a bottom housing endplate are recessed and have cured b-stage material disposed in respective recesses along an interface between the endplates and housing sidewalls wherein the cured b-stage material acoustically seals a top and bottom portion of the housing.

According to one implementation, a sound-producing balanced armature receiver comprises a housing assembly including a sidewall and a first endplate recessed below a first edge of the sidewall. A diaphragm is movably retained within the housing and separates an interior of the housing into a back volume and a front volume having a sound port. An electro-mechanical motor is located in the back volume, the motor including a coil and an armature movably disposed between two magnets, the armature mechanically linked to the diaphragm, wherein sound is emitted from the sound port in response to an excitation signal applied to the coil. A first cured b-stage material is disposed in the recess along an interface between the first endplate and the sidewall, wherein the first cured b-stage material acoustically seals at least a portion of the housing.

According to another aspect, the cured b-stage material covers an entire outer surface of the one or more endplates. In another implementation, the cured b-stage material forms a quasi-ring covering a peripheral portion of an outer surface of one or more endplates in the recessed portion and the central portion of the outer surface of the first endplate is devoid of cured b-stage material. The uncured quasi ring has an outer edge shaped substantially the same as an outer edge of the endplate, wherein a central portion of the endplate is devoid of b-stage material before and after curing. In some implementations the uncured b-stage material is a sheet of material sized substantially the same as the one or more endplates.

According to an implementation, an acoustic receiver comprises a first receiver subassembly comprising a bottom housing plate and a motor disposed on the bottom housing plate, the motor including a coil, a yoke retaining first and second magnets, and a reed having a portion extending between the magnets. A second receiver subassembly comprises a closed-ended housing sidewall having at least a first open end, the first receiver subassembly and the second receiver subassembly are separate components. The bottom housing plate is disposed within the first open end of the housing sidewall and recessed from a first edge of the housing sidewall. A diaphragm is located in the receiver housing, the diaphragm separating an interior of the receiver housing into a front volume and a back volume, wherein the front volume includes an acoustical port and the motor is disposed in the back volume. A link interconnects a movable portion of the reed with a movable portion of the diaphragm, wherein the reed is movable between the first and second magnets in response to an excitation signal applied to the coil. A cured b-stage material disposed in the recess along an interface between the bottom housing plate and the housing sidewall, wherein the cured b-stage material acoustically seals at least a portion of the receiver housing.

According to an approach, a balanced armature receiver is made by a method comprising movably retaining a diaphragm within sidewalls of a housing having at least a first open end, the diaphragm separating an interior of the housing into a back volume and a front volume having a sound port. The method also includes locating an electro-mechanical motor in the back volume, the motor including a coil and an armature movably disposed between two magnets, the armature mechanically linked to the diaphragm. The method includes covering the first open end of the housing with a first endplate retained in a recess below a first edge of the sidewalls and applying a first uncured b-stage material in the recess along an interface between the first endplate and the sidewalls. Once the uncured b-stage material is applied, it is cured, wherein the first cured b-stage material acoustically seals at least a portion of the housing.

Figure 1:
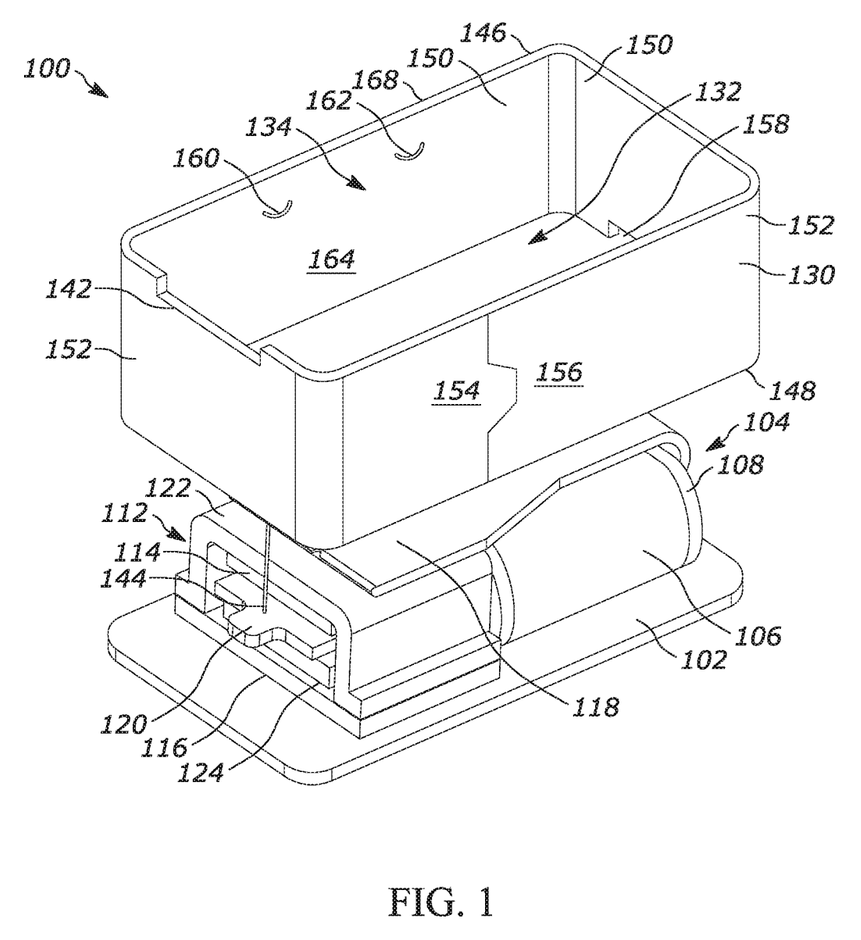
FIG. 1 illustrates a partial assembly view of an acoustic receiver in accordance with one example set forth in the disclosure.
Figure 2:
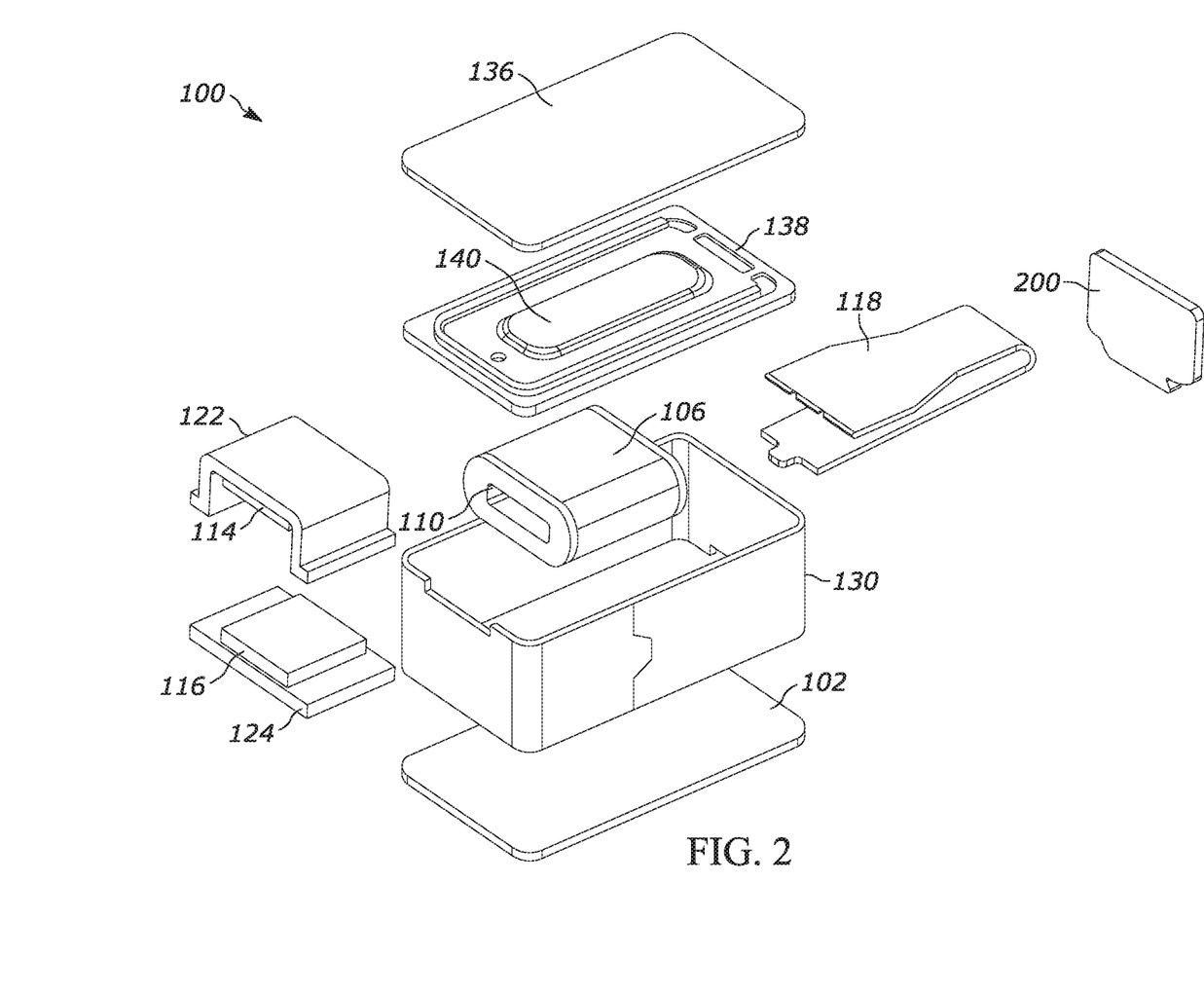
FIG. 2 is an exploded view of an acoustic receiver in accordance with one example set forth in the disclosure.

FIG. 1 illustrates one example of an acoustic receiver 100 without a diaphragm and top cover plate. The acoustic receiver 100 may be a single armature receiver, a multiple armature receiver or any other suitable acoustic receiver. In this example, the acoustic receiver 100 includes a bottom housing plate 102, a motor 104 disposed on the bottom housing plate 102. The motor 104 includes a coil 106. Referring also to FIG. 2, the coil 106 in this example is wound around a coil bobbin 108. However, in other embodiments, the coil does not include the bobbin. In FIG. 2, the coil includes a coil passage 110 and the yoke retains a first magnet 114 and a second magnet 116 in spaced apart relation. A reed (or armature) 118 has a portion 120 extending through the coil 106 and between the magnets 114 and 116.

In this example, the yoke is an assembly including a strap portion 122 retaining magnet 114 and a magnetic plate 124 retaining the magnet 116. In FIGS. 1 and 2, the magnet plate 124 is fastened to the housing cover 102 by a weld, or adhesive, or crimped flanges or by some other fastening mechanism. In some embodiments, the magnet plate 124 may also be located by protrusions formed or disposed on the bottom plate 102. The strap portion 122 may be welded to the magnet plate 124 before or after the magnet 114 is fastened thereto. In other embodiments, the yoke is a stamped or laser cut and folded structure with butt joined ends, or stacked closed-ended plates welded together, or a section of extruded tube stock, or any other suitable structure. The first and second magnets may be fastened to the yoke by a weld, adhesive or crimped flange or by some other fastening mechanism. In FIGS. 1-2, the reed 118 is a U reed with an end portion fastened to the yoke. In other embodiments, however, the reed may be configured differently, for example it may be an E reed or M reed or some other reed shape. The motor and the bottom cover plate or housing cover form a first receiver subassembly.

In FIGS. 1-2, a closed-ended housing wall or sidewall 130 is disposed about the motor 104 after the motor is disposed on the bottom plate 102. The housing wall 130 includes at least a first open end 132 and in some embodiments a second open end 134. The closed-ended housing sidewall forms a second receiver subassembly. The first and second subassemblies are assembled by fastening the housing cover or plate 102 with the motor to the first open end 132 of the closed-ended housing sidewall. In FIGS. 1-2, the closed-ended housing sidewall also has a second open end 134 coupled to a top housing plate 136. The closed-ended housing wall 130, the bottom housing plate 102 and the top housing plate 136 are discrete elements that when assembled, form a receiver housing. In other embodiments however, the closed-ended housing sidewall may be embodied as five-sided cup with only a single open end to which the housing cover is fastened. Such cups may be formed in a drawing process. Thus assembled, the closed-ended housing sidewall and housing cover form at least a portion of a receiver housing, wherein the sidewall is circumferentially disposed about the motor.

In FIG. 2, a diaphragm 138 is disposed and retained in the receiver housing when assembled. The diaphragm 138 separates an interior of the receiver housing into a front volume and a back volume. The motor 104 is disposed in the back volume. The diaphragm 138 includes a paddle 140 which when moved causes sound to emanate from an acoustical notch opening or port 142 located in the closed-ended housing wall 130. In some embodiments, the receiver housing is formed by fastening the top housing plate 136 to the second open end portion 134 of the closed-ended housing wall 130. The one or more housing covers can be fastened to the closed-ended housing sidewall by a weld, or adhesive, or crimped flanges, or by some other fastening mechanism. Depending on the configuration of the closed-ended housing sidewall, the diaphragm may be assembled with the closed-ended housing side wall before or after the closed-ended housing sidewall is assembled with the first receiver subassembly. If the closed-ended housing sidewall is a cup having only one open end, the diaphragm must be disposed and retained in the cup before the cup is assembled with the first receiver subassembly.

In FIG. 1, a link 144, which may be embodied as a discrete drive rod or ribbon, an appendage of the reed, or some other interconnecting member, interconnects a moveable portion 120 of the reed with a moveable portion of the diaphragm 138, in this case the paddle 140 shown in FIG. 2. The reed is moveable between the first and second magnets 114 and 116 in response to an excitation signal applied to the coil 106. FIG. 2 also illustrates a termination cover 200 which may include one or more a connectors or contacts coupled to the electrical leads of the coil. The termination cover is disposed on an outer side of the receiver housing where the coil and any other electrical leads emanate from the interior of the housing. The termination cover may be fastened to the housing with adhesive and any openings around the electrical leads may be sealed with adhesive or other material.

In FIGS. 1-2, the closed-ended housing wall 130 in this example is shown to be a folded sheet material, such as a strip of folded metal, having a first edge 146 and a second edge 148 an inside surface 150, an outside surface 152, a first end 154 and a second end 156. The first edge 146 includes an acoustical notch opening or port 142 located in the front volume whereas the second edge 148 includes a lead pass-through opening or port 158 located in the back volume. In other embodiments, these ports may be located inwardly of the sidewall edge. The lead pass-through opening allows the passage of electrical leads for the coil and any other electronic components through the housing sidewall for termination at cover 200.

The inside surface 150 includes projections also referred to as semi-perforations 160, 162 as well as corresponding projections on the opposing sidewall (not shown). The projections 160 and 162 locate the diaphragm 138. In some embodiments, the diaphragm is positioned on the perforations and fastened with an adhesive. Alternatively, the diaphragm may be located and retained between an array of oppositely positioned perforations. In another embodiment, the diaphragm is positioned with tooling during assembly an then welded to the sidewall, without the need for perforations. In some embodiments, closed-ended housing sidewall 130 includes four sidewalls such that the acoustical notch opening 142 is in a sidewall that is opposed to the sidewall that includes the lead pass through opening 158. However it will be recognized that any suitable location of the lead pass through opening and acoustic notch opening may be employed. Opposing sidewalls 164 and 168 each include the projections that are adapted to locate the diaphragm 138. In this example, sidewall 164 is formed also by butt joining of the first end 154 and second end 156. However, the joint may be placed at any suitable sidewall.

In this example, the first end and second end 154 and 156 are pressed together so that the first and second connecting portions engage with each other. However, it will be recognized that any suitable securing mechanism may be employed including braising, blooming, or any other suitable mechanism for providing the first end and second end to be suitably connected with each other.

Unlike prior designs, in some embodiments, the acoustic receiver employs a separate bottom housing plate with a motor or portion of a motor, wherein the subassembly may be assembled with another subassembly like a closed-ended housing sidewall that has at least one open end.

Figure 3:
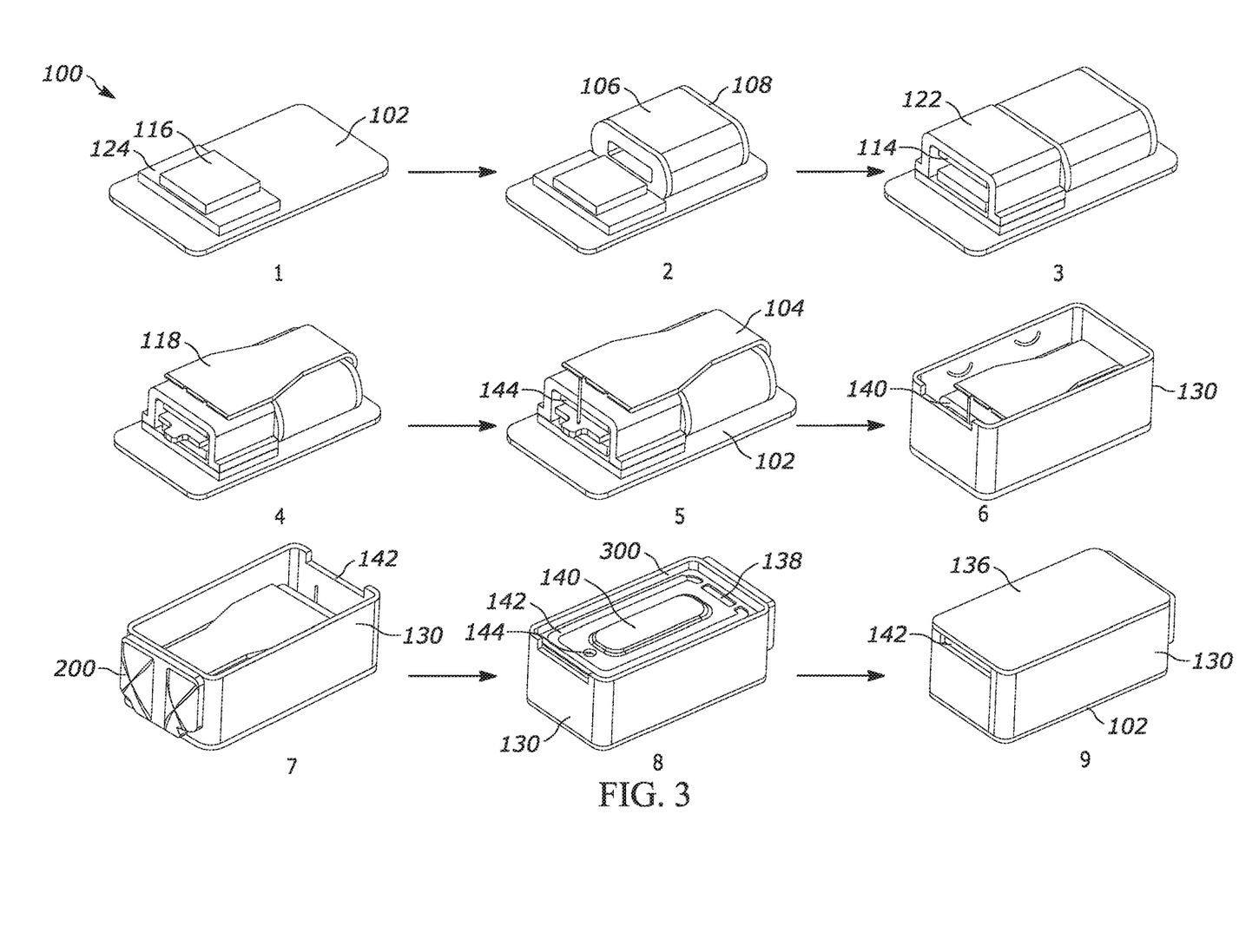
FIG. 3 is a diagram illustrating one example of an assembly sequence to assemble the acoustic receiver shown in FIG. 2.
Figure 4:
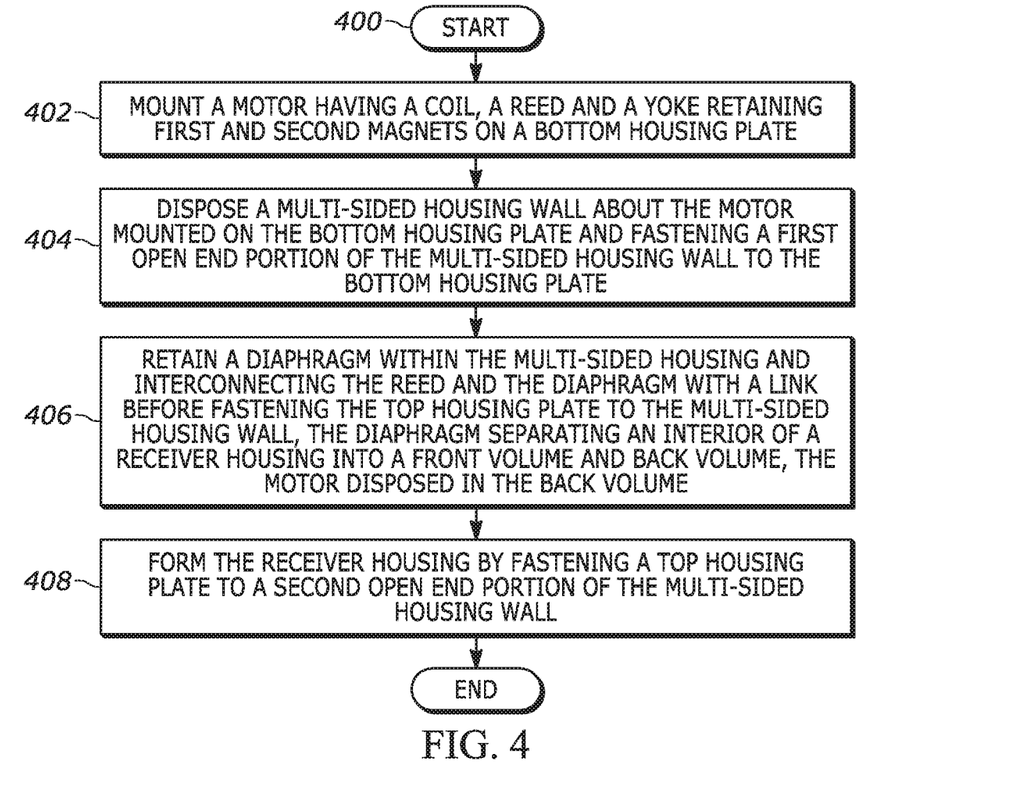
FIG. 4 is a flowchart illustrating a method for manufacturing an acoustic receiver in accordance with one example set forth in the disclosure.

Referring to FIGS. 3 and 4, an example of an assembly method will be described to make an acoustic receiver 100. In this example, nine steps are shown in FIG. 3, however any suitable number may be employed. The front volume 300 is shown in step 8. The operations described herein may be carried out manually or using automated assembly machines and fixtures. As shown in FIG. 4, assembly of the acoustic receiver is shown starting in block 400. In block 402, the a motor 104 having a coil, a reed, and a yoke retaining first and second magnets is mounted on the bottom housing plate 102 to form a first receiver subassembly. This is shown for example, in step 5. For example, the motor assembly may be at least partially preassembled and then placed on the bottom housing plate.

Referring back to FIG. 3, a first operation 1 may include placing the magnetic plate 124 on a top surface of the bottom housing plate 102. This may be done at a spot welding operation or any other suitable attachment operation. The magnet 116 is affixed on a magnetic plate. It will also be recognized that the operations described herein may combined or reordered as desired and may include preassembly operations or other operations as desired. For example, the magnets may be fastened to the yoke before or after the yoke is fastened to the housing cover, depending on the type or configuration of the yoke, various examples of which were discussed above. As shown in operation 2, the coil 106 and bobbin 108 are secured to the bottom housing plate 102 via a suitable adhesive. The coil may be located by the yoke of by other structure on the housing cover. In operation 3 the yolk strap 122 with the magnet 114 is placed on the magnetic plate and secured by a weld or retaining structure. The reed 118 is positioned through the coil passage and between the magnets 114 and 116 as shown and fastened in operation 4. Whether the reed is fastened to the yoke or other structure depends on the configuration of the reed. As shown in operation 5, link 144 (drive rod) that interconnects a moveable portion of the reed 118 with a moveable portion of the diaphragm 138 is placed in the reed. Mounting all or some portions of the motor on the bottom housing plate 102 before assembly of the closed-ended housing wall 130 provides ready access to the motor or portions thereof during the subassembly process as discussed further below.

Referring also to FIG. 4, as shown in block 404 and as illustrated in operation 6 of FIG. 3, the closed-ended housing wall 130 subassembly is disposed about the motor 104 mounted on the bottom housing plate 102 subassembly and the edge 148 of the closed-ended housing wall 130 is fastened to the bottom housing plate 102. This is secured using a weld, or crimped flange, or adhesive or other suitable means In this example, the closed-ended housing wall 130 is formed (folded) from a strip of stamped or laser cut metal (as further described below) and the base plate is made of steel. However, any suitable materials may be employed. For example, the closed-ended housing wall may be formed of metal in a drawing process. Alternatively, the closed-ended housing wall may be made from plastic, carbon fiber, metal, or any other suitable material in a folding, drawing, extruding, molding or other suitable process.

Referring back to FIG. 3, as shown in operation 7, the terminal cover 200 is affixed to the exterior sidewall of the receiver housing that includes the lead pass through opening 158. The cover may be retained with adhesive or some other retaining mechanism and any the lead opening may be sealed with adhesive or other suitable material. The terminal cover includes an electrical interface, e.g., contacts, electrically coupled to the leads of the coil and other electrical components within the receiver housing. Referring to block 406 and operation 8, the diaphragm 138 is located within the closed-ended housing wall 130 by the protrusions 160, 162, 608 and 610 (see FIG. 6) as discussed herein. The link 144 interconnects with the reed and the diaphragm. For example, the link 144 is attached to the reed 118 and passed through an opening within the diaphragm 138 and secured thereto using conventional techniques known in the art. The diaphragm 138 separates an interior of the receiver housing into a front volume and a back volume as noted. The motor 104 is disposed in the back volume of the receiver housing. Referring to operation 9 and as shown in block 408, the receiver housing is closed by fastening the top housing plate 136 to the second open end 134 of the closed-ended housing wall 130.

Figure 5:
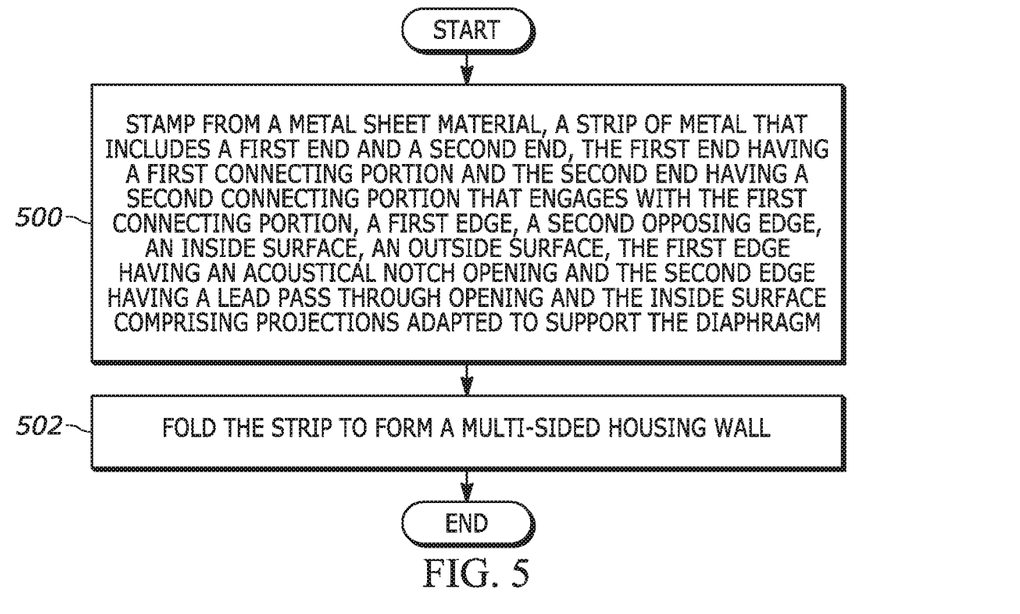
FIG. 5 is a flowchart illustrating a method of making an acoustic receiver component in accordance with one example set forth in the disclosure.
Figure 6:
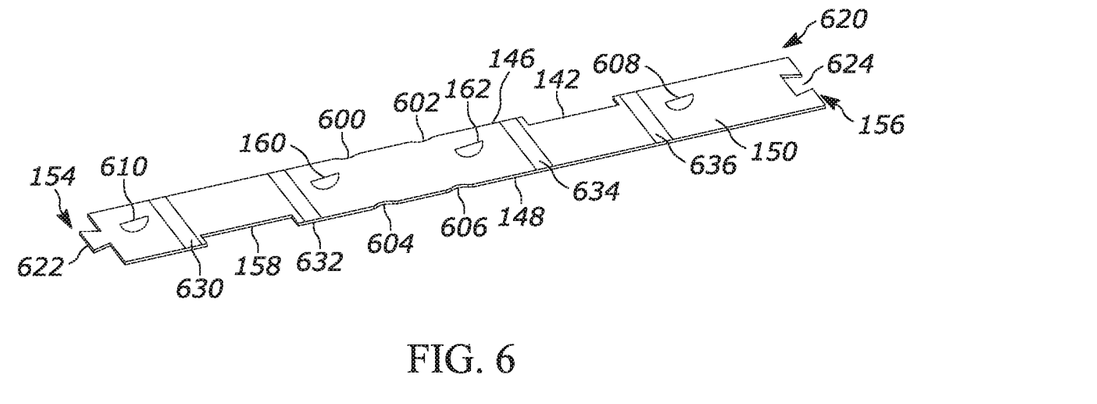
FIGS. 6-10 illustrate a strip of sheet material folded to form a closed-ended housing wall in accordance with one example set forth in the disclosure.

FIG. 5 illustrates a process flow for making an acoustic receiver component, namely the closed-ended housing wall subassembly. In this example, as shown in FIG. 6, a stamping machine stamps from a metal sheet material, a strip of metal 620 that includes the first end 154 and second end 156. Alternatively the strip may be cut with a laser or other cutting tool. The first end having a first connecting portion 622, in this example shown as a protruding tab. The strip is stamped to include the second end 156 that includes a second connecting portion 624 shown to be a notch adapted to frictionally engage the protruding portion 622 in a pressed fit manner. As such, the first and second connecting portions are configured to engage with each other to form a pressed fit connection. In another example, the ends may be flat if desired and suitably braised, glued or otherwise attached at a butt joint, alone or in combination with the press fit described above. Any other suitable interconnecting mechanism may also be employed. The strip of metal 620 includes the first edge 146, the second opposing edge 148, the inside surface 150 and the outside surface 152. As shown and previously described with respect to FIGS. 1 and 2, the first edge 146 includes the acoustical notch opening 142. The inside surfaces include the stamped projections or semi-perforations 160, 162, 608 and 610 adapted to locate the diaphragm 138. A corresponding indentation 800 (see FIG. 8) on the outside surface 152 for projection 608 (see FIG. 6) is shown for illustration purposes. However it will be recognized that the protrusions need not be stamped and may be added to the inner surface. This may be done in any suitable manner such as by adding epoxy material, metal or other material. Scored folding lines 630, 632, 634 and 636 are used to ease and guide the corner folding operation to form the various sidewall portions as shown. As shown in block 502 of FIG. 5, the method includes folding the metal strip, as also shown in FIGS. 7-10 to from the closed-ended housing sidewall.

Referring to FIGS. 6-10, an example of a closed-ended housing wall is shown in various stages being formed by folding a single sheet material. In other embodiments, the closed-ended housing wall may be formed from two or more sheets fastened end-to-end by butt joints or press fit tabs and notches. Projections 608 and 610 are shown which are positioned such that when the closed-ended housing wall 130 is completely folded, they are of the same height from the top edge 146 and serve to locate the diaphragm 138.

Figure 7:
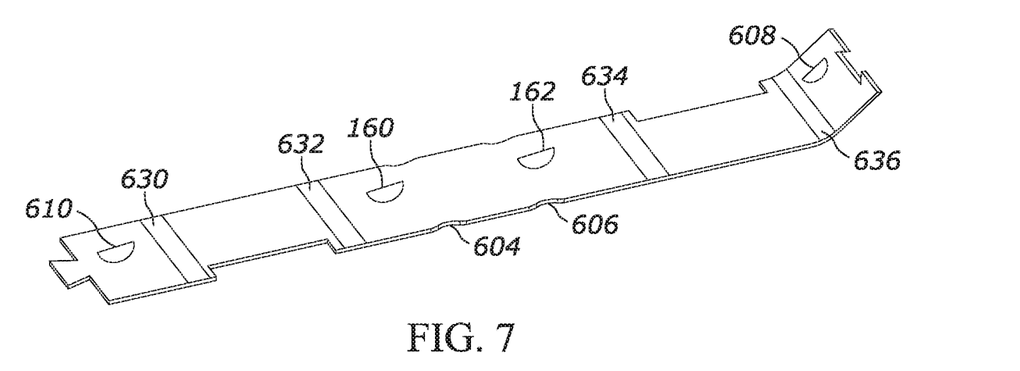
Figure 8:
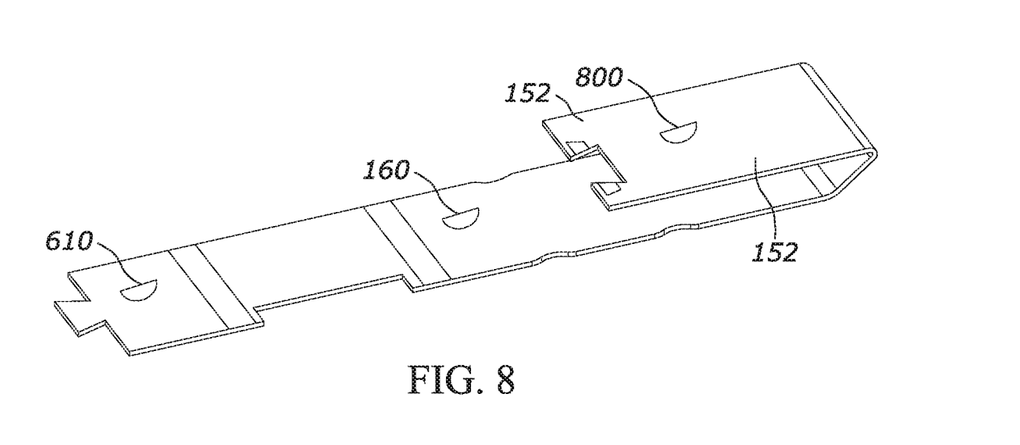
Figure 9:
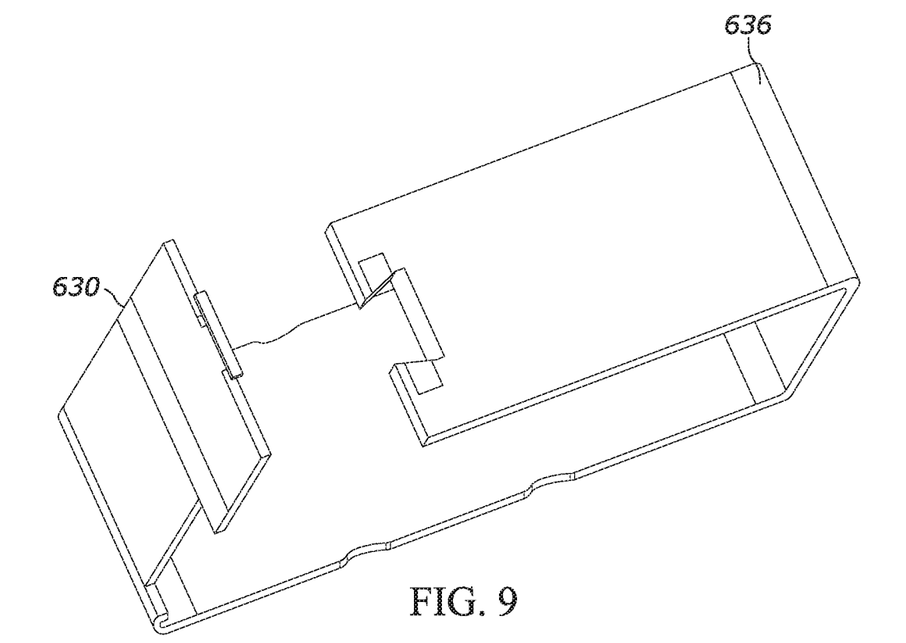
Figure 10:
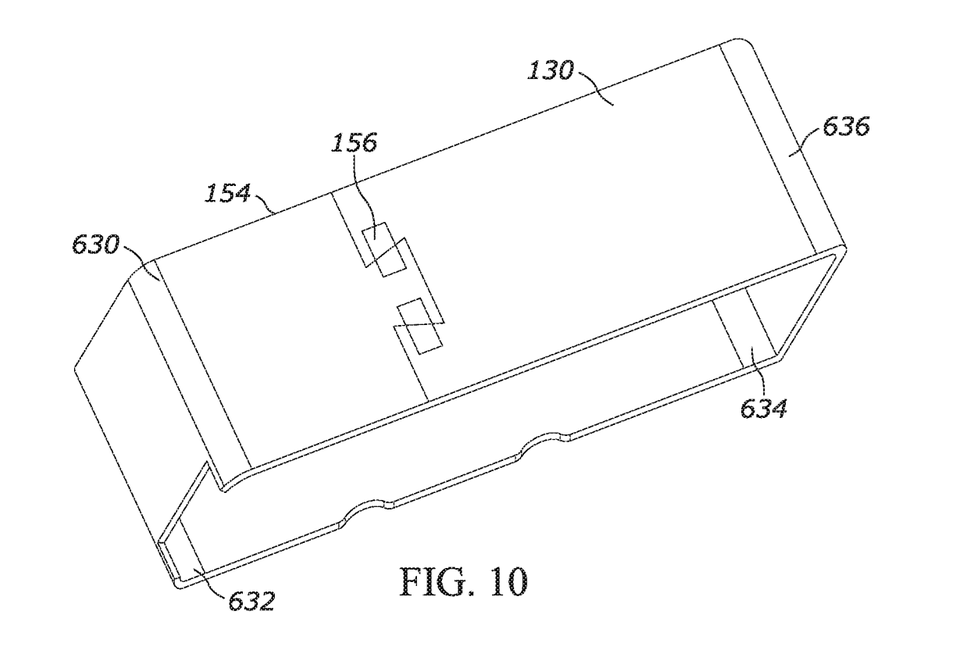

FIG. 7 shows a first fold along fold score line 636, FIG. 8 shows a second fold along fold score line 634 (shown in FIG. 7), FIG. 9 illustrates a fold line along 632 (shown in FIG. 7) and FIG. 10 illustrates a closed-ended housing wall 130 formed by connecting the first end and second end 154 and 156. For clarity, FIG. 9 does not illustrate the indent 800 on the outer surface 152 that would correspond to protrusion 608. The folding process may be done in any suitable manner and may be readily performed using automated equipment after the cutting process.

Employing a discrete bottom housing plate, top housing plate and closed-ended housing wall with open top and bottom portions reduces cost, facilitates automated assembly and has other benefits, for example it allows for improved camera inspection during the manufacturing process compared to other systems that required the placing of components within a five sided cup. In addition, other welding angles can be employed to attach various components as well as other ease of operation such as attaching the link 144. An acoustic device as disclosed herein can be manufactured using automated equipment in a more cost effective and faster manner as compared to existing manual assembly processes. It will be recognized that any suitable materials may be employed, and other variations are contemplated. For example, the bottom plate can be a ferromagnetic material, instead of steel, depending upon magnetic circuit design and the end use application among other factors. In addition, the base plate may have varying thicknesses to avoid, for example, using the yoke plate 124. Differing reed designs and coil designs may also be employed as well as different diaphragm designs if desired.

Figure 11:
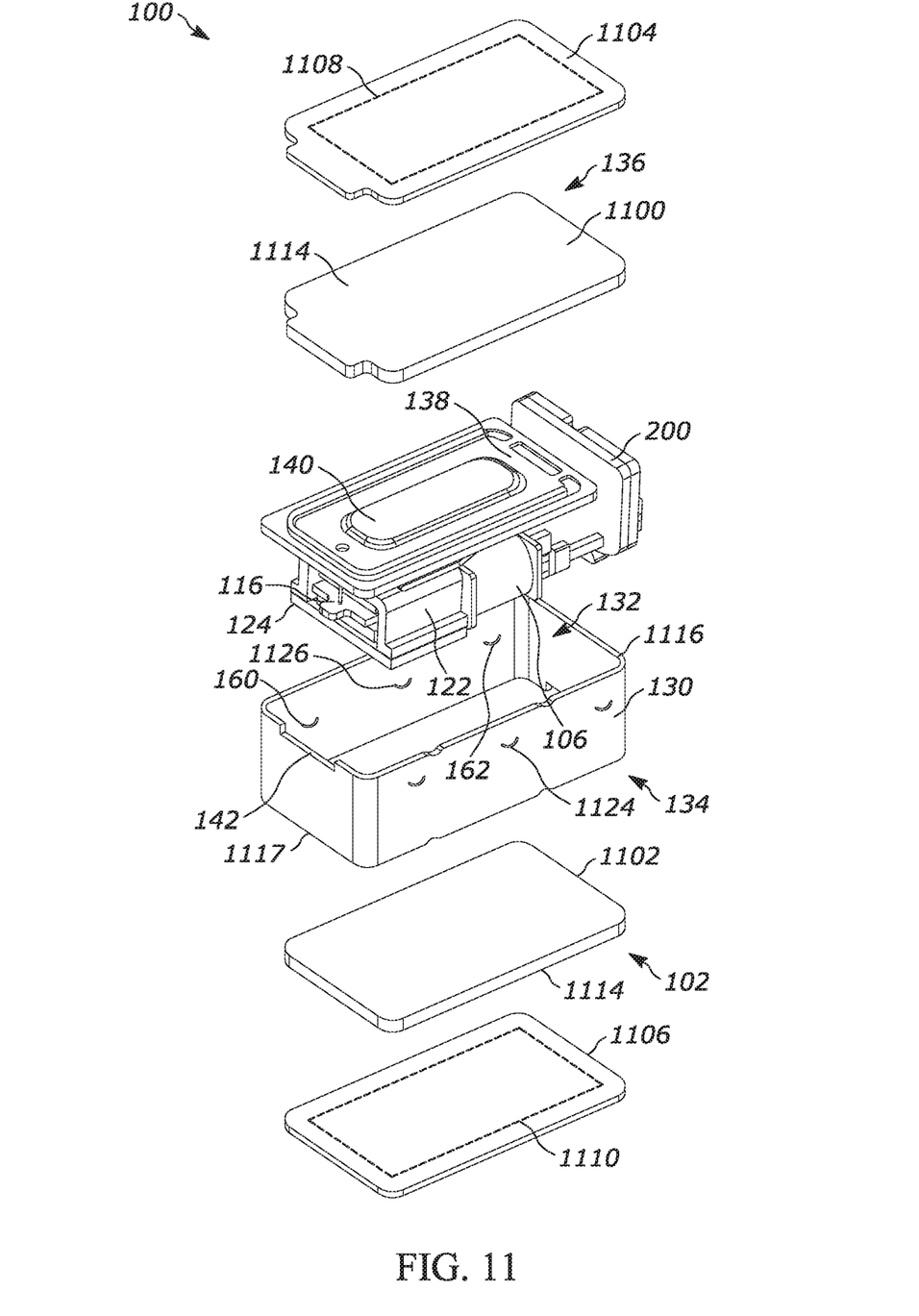
FIG. 11 is an exploded view of an acoustic receiver in accordance with one example set forth in the disclosure.
Figure 12:
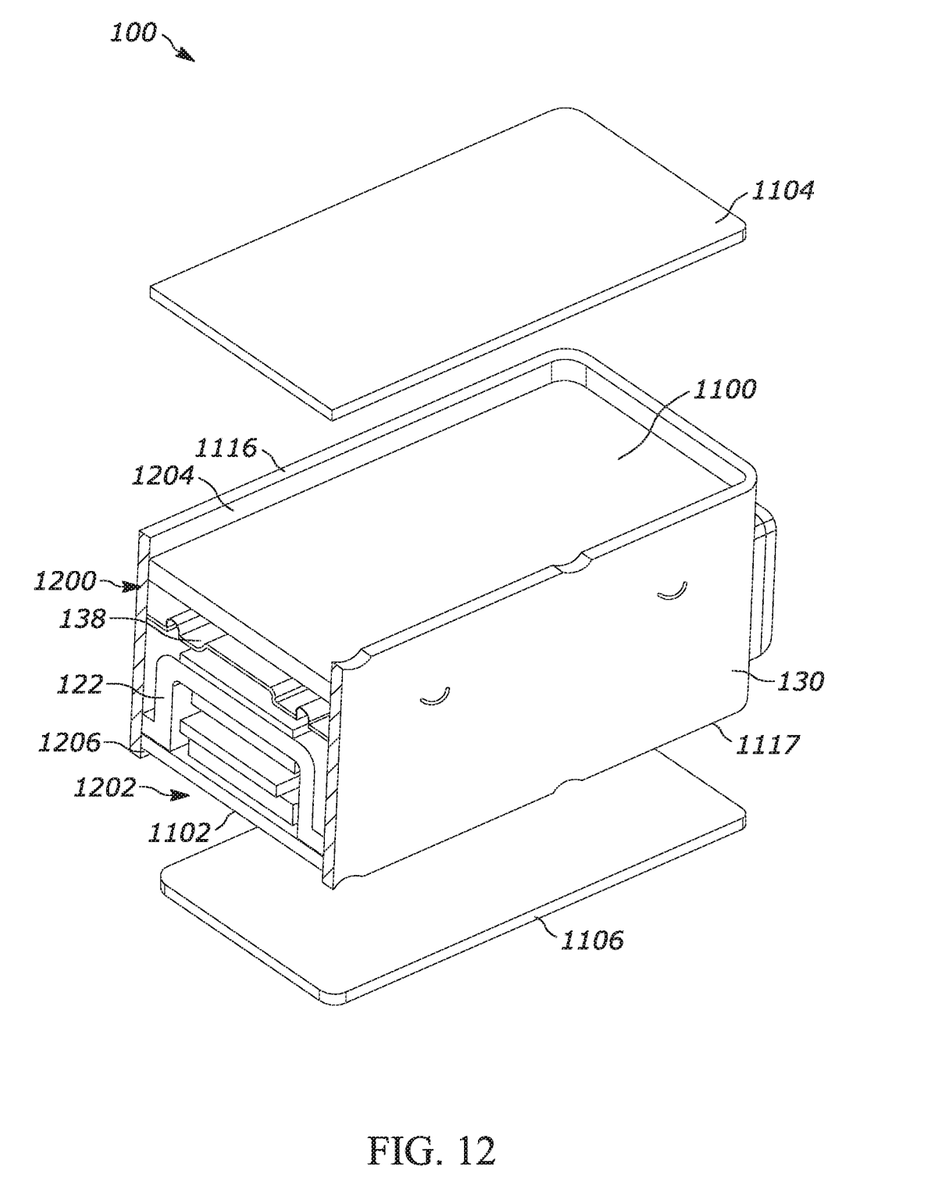
FIG. 12 illustrates a partial assembly and cross-sectional view of an acoustic receiver shown in FIG. 11, in accordance with one example set forth in the disclosure.

In another implementation shown in FIGS. 11-12, one or more recessed housing endplates are used in conjunction with b-stage material to form one or more housing seals that affords an automated sealing process to seal the top and/or bottom of the acoustic receiver. In one example, an uncured b-stage sheet material is disposed on a top and bottom side of the balanced armature receiver and then cured to provide sealing. The top and bottom endplates in this example have been reduced to recess inside of the sidewalls and a flat sheet of uncured b-stage material is placed on top and bottom plates of the acoustic receiver. The uncured b-stage material is then cured for sealing. In one example during manufacturing, the uncured b-stage sheet is picked and placed using a machine. Alternatively, the uncured b-stage sheet can be cut and formed as a strip or frame and dropped in place before curing. Any other suitable operations may also be employed.

By way of example, FIGS. 11-12 illustrate one example of an acoustic receiver 100 that employs recessed endplates 1100 and 1102. Endplates are also referred to herein as top and bottom housing plates. However, it will be recognized that the acoustic receiver 100 (shown to be a balanced armature receiver) may employ either endplate 1100 and/or recessed endplate 1102 depending upon a desired design. For example, in other implementations, the receiver housing uses only a single discrete endplate wherein the other endplate is integrally formed with the sidewall 130 as a cup, by employing a drawing operation as previously described.

In the example where two recessed endplates are used, an uncured b-stage material shown as sheet 1104 is configured to correspond in shape to the housing endplate 1100 and is placed over the recessed endplate 100. Thereafter, an activation process is applied to cure the uncured b-stage material 1104 as further set forth below. Similarly, uncured b-stage material shown as sheet 1106 is sized to conform to the shape of endplate 1102 (also referred to as bottom housing plate) and a curing process is applied at the same time or a different time if desired as the curing process for sheet 1104. The b-stage material shown as sheets 1104 and 1106 in this example, are disposed in a recess along an interface between the endplates and the sidewall. After curing cured b-stage material covers the entire surface of an outer surface of the endplates.

For other implementations, dashed lines 1108 and 1110 illustrate that the uncured b-stage material is formed as a quasi-ring meaning that a portion of the interior is removed and a periphery of the b-stage material is placed on the top and/or bottom endplates 1100 and 1102 such that the central portion of an outer surface of an endplate designated as 1112 and 1114 are devoid of cured b-stage material after a curing process has occurred. It will be recognized that any other suitable configuration of the b-stage material may be employed.

FIGS. 11 and 12 illustrate a housing assembly that includes a sidewall 130 having endplate 1100 recessed below a first edge 1116 of the sidewall 130. In this example, the recessed areas generally shown as 1200 and 1202 are sized to accommodate the uncured b-stage material within the recessed area. The endplate 1100 is recessed below the first edge 1116 of the sidewall of housing wall 130. The diaphragm 138 is movably retained within the housing 130 and separates an interior of the housing into a back volume and a front volume having a sound port 142 as previously described. The electro mechanical motor 104 is located in the back volume. The motor 104 includes a coil and an armature (also referred to as reed) 118 is movably disposed between the magnets. The armature is mechanically linked to the diaphragm as previously described where sound is omitted from the sound port 142 in response to an excitation signal applied to the coil 106.

After the uncured b-stage material 104 and 106 has been cured, the balance armature receiver then has a cured b-stage material disposed in the recess 1204 in the recess area 1200 and recess 1206 in recess area 1202. The b-stage material acoustically seals portions of the housing where it is applied about the interface with the sidewalls. The cured b-stage material, in one example, is a material that is curable in discrete stages using a catalyst, as known in the art. In another example, the cured b-stage material is a material that is curable using heat, radiation or other activation mechanism as a catalyst. It will be recognized that when a cup is employed, b-stage material is placed to seal the top housing plate 136 to acoustically seal the top portion of the housing.

The housing assembly includes the endplate 1102 recessed below the edge of the sidewall and the endplate 1102 is opposite the endplate 1100. The cured b-stage material 1106 disposed in the recess 1206 along an interface between the end plate 1102 and the sidewall is configured such that the cured b-stage material acoustically seals the bottom of the housing.

When made as multiple assemblies as previously described, the acoustic receiver 100 employs a first receiver assembly that includes a bottom housing plate such as endplate 1102, and the motor which includes the coil, yoke, magnets and reed having a portion extending between the magnets. Another receiver assembly includes the closed end housing sidewall 130 having at least one open end 134. The first receiver assembly and the second receiver assembly are separate components. The bottom housing plate, such as endplate 1102, is disposed within the first open end 134 of the housing sidewall 130 and is recessed from a first edge 1117 of the housing sidewall. The diaphragm 138 is located in the receiver housing as previously noted.

Figure 13:
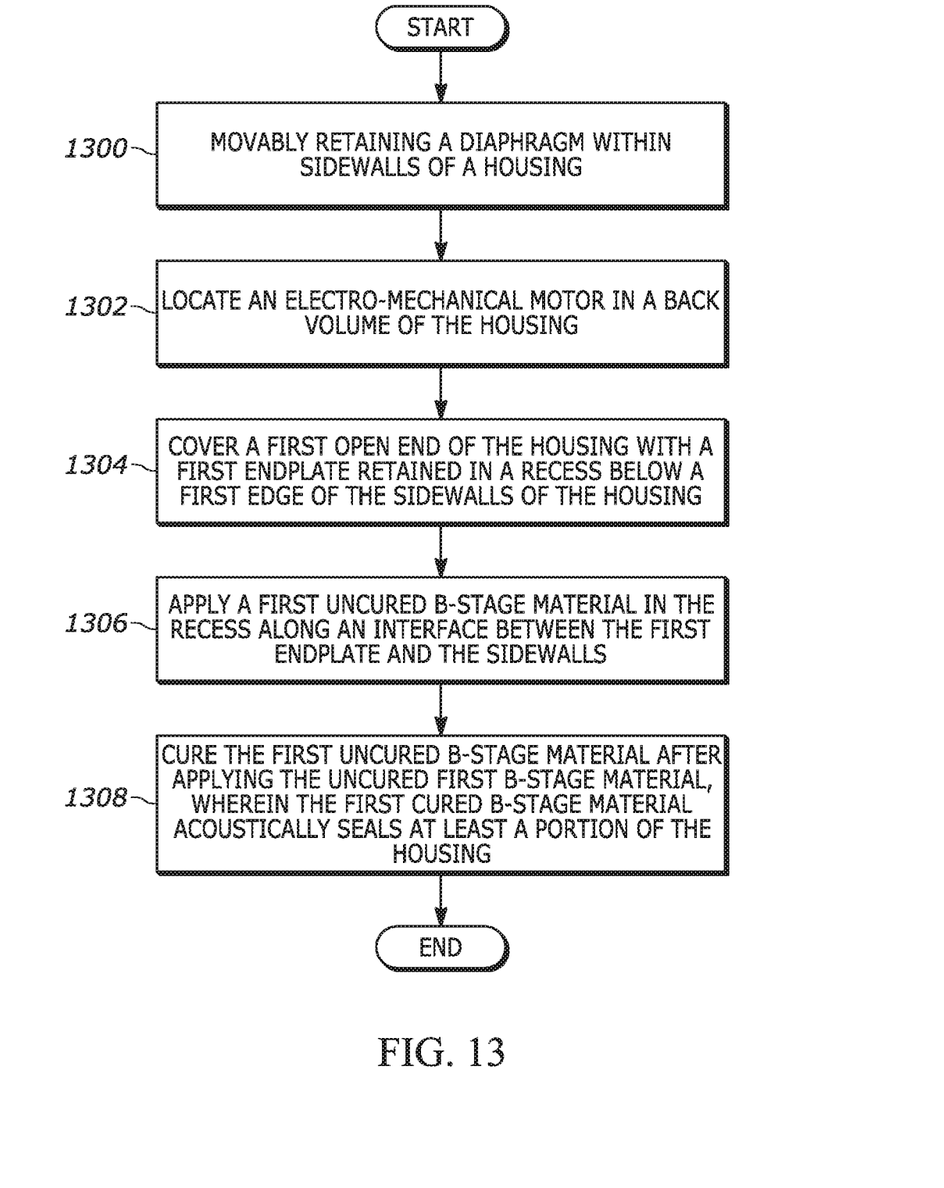
FIG. 13 is a flowchart illustrating a method for manufacturing an acoustic receiver in accordance with one example set forth in the disclosure.

FIG. 13 illustrates one example of a method for making the balanced armature receiver shown in FIGS. 11 and 12 and include as shown in step 1300, movably retaining a diaphragm within the sidewalls of the housing. The housing has an open end as noted above and the diaphragm separates an interior of the housing into a back volume and a front volume having a sound port. As shown in block 1302, the method includes locating the electromechanical motor 106 in the back volume. The motor including a coil, armature (also referred to as a reed) movably disposed between two magnets, the armature mechanically linked to the diaphragm as described above. As shown in block 1304, the method includes covering the open end of the housing with the first endplate retained in a recess below a first edge of the sidewalls as noted above. As shown in block 1306, the method includes applying an uncured b-stage material in the recess along an interface between the first endplate and the sidewalls. As shown in block 1308, the method includes curing the uncured b-stage material after applying the uncured b-stage material. The cured b-stage material acoustically seals at least a portion of the housing. The steps may be performed by pick and placement machinery, manual operations in combination therewith, or any other suitable techniques. As noted above, the b-stage material, in one example, is a sheet of material sized substantially the same as the endplate. The b-stage material can be configured so that it covers the entire outer surface of the endplate. In other examples, the b-stage material may be shaped in a ring or frame design having an outer edge shaped substantially the same as an outer edge of the endplate. When in a ring shape, the b-stage material is applied over a peripheral portion of the endplate to form the seal and the central portion of the endplate is devoid of b-stage material before and after curing. Alternatively, the uncured b-stage material may be embodied as multiple discrete portions that are selectively placed on the endplate before curing.

When multiple endplates are used, the method includes covering a second open end of the housing with another endplate retained in a recess below an edge of the sidewalls and applying another b-stage material in the recess along an interface between the second endplate and the sidewalls. The method also includes curing the additional b-stage material in the same operation or in sequential operations if desired after applying the additional b-stage material. The cured b-stage material acoustically seals the portion of the housing over which the b-stage material is placed. The b-stage materials are sheets in one example sized substantially the same as the endplates over which they are placed, however, any suitable configuration may be employed.

In another method for manufacturing the acoustic receiver of FIG. 11, the receiver subassembly that has the bottom housing plate 1102 mounted to the motor as previously noted is placed inside housing sidewall 130. The bottom housing plate 1102 is secured to interior surfaces of the housing sidewall 130 by spot welding or other suitable securing operation. The diaphragm 138 is placed on the perforations 160, 162 (and others not shown) as noted above. A top housing plate such as endplate 1114 is then located above the diaphragm in a recessed fashion. In one example, additional projections or perforations are stamped into the housing sidewalls of housing wall 130 to support the top housing plate 1100. Alternatively, the endplates 1100 and 1102 may be positioned within the sidewall by tooling during manufacturing and then welded to the sidewall without the need for perforations, prior to placing the b-stage material over the tops of the endplates. Alternatively, the endplate may be press fit into grooves formed on an interior side of the sidewall. In other embodiments, other suitable endplate attachment mechanisms may be employed.

After attaching the endplates, the uncured b-stage material sheet 1104 is then placed on top of the top housing plate 1100 and the uncured b-stage material 1106 is placed over the bottom housing plate 1102. The uncured b-stage material of the assembly may be subject to a heat or other curing operation to seal the receiver housing. The above processes may be performed by suitable assembly machinery and/or through other processes.

While the present disclosure and what is presently considered to be the best mode thereof has been described in a manner that establishes possession by the inventors and that enables those of ordinary skill in the art to make and use the same, it will be understood and appreciated that in light of the description and drawings there are many equivalents to the exemplary embodiments disclosed herein and that myriad modifications and variations may be made thereto without departing from the scope and spirit of the disclosure, which is to be limited not by the exemplary embodiments but by the appended claimed subject matter and its equivalents.

What is claimed is:

1. A sound-producing balanced armature receiver comprising:
    a housing assembly including a sidewall and a first endplate recessed below a first edge of the sidewall;
    a diaphragm movably retained within the housing and separating an interior of the housing into a back volume and a front volume having a sound port;
    an electro-mechanical motor located in the back volume, the motor including a coil and an armature movably disposed between two magnets, the armature mechanically linked to the diaphragm, wherein sound is emitted from the sound port in response to an excitation signal applied to the coil;
    a first cured b-stage material disposed in the recess along an interface between the first endplate and the sidewall, wherein the first cured b-stage material acoustically seals at least a portion of the housing.

2. The receiver of claim 1, the cured b-stage material is a material that is curable in discrete stages using a catalyst.

3. The receiver of claim 2, the cured b-stage material is a material that is curable using heat or radiation as a catalyst.

4. The receiver of claim 1, the cured b-stage material covers an entire outer surface of the first endplate.

5. The receiver of claim 1, the cured b-stage material forms a ring covering a peripheral portion of an outer surface of the first endplate, wherein a central portion of outer surface of the first endplate is devoid of cured b-stage material.

6. The receiver of claim 1, the housing assembly including a second endplate recessed below a second edge of the sidewall, the second endplate opposite the first endplate, a second cured b-stage material disposed in the recess along an interface between the second endplate and the sidewall, wherein the second cured b-stage material acoustically seals at least a portion of the housing.

7. The receiver of claim 6, the cured b-stage material covers entire outer surfaces of the first and second endplates.

8. The receiver of claim 6, the cured b-stage material forms a ring covering peripheral portions of outer surfaces of the first and second endplates, wherein central portions of the outer surfaces of the first and second endplates are devoid of cured b-stage material.

9. An acoustic receiver comprising:
a first receiver subassembly comprising:
a bottom housing plate; and
a motor disposed on the bottom housing plate, the motor including a coil, a yoke retaining first and second magnets, and a reed having a portion extending between the magnets;
a second receiver subassembly comprising a closed-ended housing sidewall having at least a first open end, the first receiver subassembly and the second receiver subassembly are separate components,
the bottom housing plate disposed within the first open end of the housing sidewall and recessed from a first edge of the housing sidewall;
a diaphragm located in the receiver housing, the diaphragm separating an interior of the receiver housing into a front volume and a back volume, wherein the front volume includes an acoustical port and the motor is disposed in the back volume;
a link interconnecting a movable portion of the reed with a movable portion of the diaphragm, wherein the reed is movable between the first and second magnets in response to an excitation signal applied to the coil,
a first cured b-stage material disposed in the recess along an interface between the bottom housing plate and the housing sidewall, wherein the first cured b-stage material acoustically seals at least a portion of the receiver housing.

10. The receiver of claim 9, the closed-ended housing sidewall having a second open end opposite the first open end, a top housing plate disposed within the second open end of the housing sidewall and recessed from a second edge of the housing sidewall, a second cured b-stage material disposed in the recess along an interface between the top housing plate and the housing sidewall, wherein the second cured b-stage material acoustically seals at least a portion of the receiver housing.

11. The receiver of claim 10, wherein the closed-ended housing sidewall is a folded sheet material having a first end and a second end coupled at a butt joint, wherein the folded sheet material has multiple sidewall portions.

12. The receiver of claim 9, the first and second cured b-stage materials cover entire outer surfaces of the first and second endplates.

13. The receiver of claim 9, the first and second cured b-stage materials are quasit-rings covering peripheral portions on outer surfaces of the first and second endplates, wherein central portions of the first and second endplates are devoid of cured b-stage material.

14. A method of making a sound-producing balanced armature receiver, the method comprising:
movably retaining a diaphragm within sidewalls of a housing having at least a first open end, the diaphragm separating an interior of the housing into a back volume and a front volume having a sound port;
locating an electro-mechanical motor in the back volume, the motor including a coil and an armature movably disposed between two magnets, the armature mechanically linked to the diaphragm;
covering the first open end of the housing with a first endplate retained in a recess below a first edge of the sidewalls;
applying a first uncured b-stage material in the recess along an interface between the first endplate and the sidewalls;
curing the first uncured b-stage material after applying the uncured first b-stage material, wherein the first cured b-stage material acoustically seals at least a portion of the housing.

15. The method of claim 14, the first uncured b-stage material is a sheet of material sized substantially the same as the first endplate, applying the first uncured b-stage material over an entire outer surface of the first endplate.

16. The method of claim 14, the first uncured b-stage material is a quasi-ring having an outer edge shaped substantially the same as an outer edge of the first endplate, applying the first uncured b-stage material over a peripheral portion of the first endplate, wherein a central portion of the endplate is devoid of b-stage material before and after curing.

17. The method of claim 14, curing the uncured b-stage material using heat or radiation as a catalyst.

18. The method of claim 14, the housing having a second open end opposite the first open end, the method further comprising:
covering the second open end of the housing with a second endplate retained in a recess below a second edge of the sidewalls;
applying a second uncured b-stage material in the recess along an interface between the second endplate and the sidewalls;
curing the second uncured b-stage material after applying the uncured second b-stage material, wherein the second cured b-stage material acoustically seals at least a portion of the housing.

19. The method of claim 18, the first and second uncured b-stage materials are sheets sized substantially the same as the first and second endplates, applying the first uncured b-stage material over entire outer surfaces of the first and second endplates.

20. The method of claim 18, the first and second uncured b-stage materials are quasi-rings having outer edge shapes substantially the same as outer edge shapes of the first and second endplates, applying the first and second uncured b-stage materials over peripheral portions of the first and second endplates, wherein central portions of the first and second endplates are devoid of b-stage material before and after curing.

21. The method of claim 18, curing the uncured b-stage material using heat or radiation as a catalyst.

\* \* \* \* \*